United States Patent [19]
Heggen

[11] 3,895,728
[45] July 22, 1975

[54] TRACTOR VEHICLE HAVING MATERIAL HANDLING SUBFRAME

[75] Inventor: John P. Heggen, Lisbon, N. Dak.

[73] Assignee: Clark Equipment Company, Buchanan, Mich.

[22] Filed: Feb. 5, 1973

[21] Appl. No.: 329,939

[52] U.S. Cl. ............................ 214/140; 180/89 R
[51] Int. Cl. .................................... B66f 11/02
[58] Field of Search ......... 214/140; 180/89 R, 6.7, 180/6.66; 280/5 R, 5 A

[56] References Cited
UNITED STATES PATENTS

| | | | |
|---|---|---|---|
| 2,036,437 | 4/1936 | Ruediger | 180/6.7 |
| 3,231,117 | 1/1966 | Melroe | 214/140 |
| 3,688,858 | 9/1972 | Jespersen | 180/89 R |

Primary Examiner—Robert J. Spar
Assistant Examiner—Kenneth Noland
Attorney, Agent, or Firm—Jack E. Toliver

[57] ABSTRACT

A tractor vehicle and material handling subframe, in combination, especially for rigid frame, skid-steered end loaders. The subframe includes a pair of laterally spaced, longitudinally extending side beams mounted over stub axles projecting from opposite sides of the tractor body. The arrangement substantially isolates material handling forces from the tractor body and facilitates location of the drive components in a single body compartment.

13 Claims, 7 Drawing Figures

TRACTOR VEHICLE HAVING MATERIAL HANDLING SUBFRAME

FIELD OF THE INVENTION

The invention pertains to the art of rigid frame, skid steered end loaders and more particularly to a tractor body and loader subframe especially adapted for such vehicles.

BACKGROUND OF THE INVENTION

Skid steer loaders are propelled and maneuvered by driving the wheels on one side of the vehicle at a different speed and/or in an opposite direction from those on the other side of the vehicle so as to achieve a turning motion. In the case where the wheels on one side are driven forwardly and those on the opposite side reversly, the loader will turn on its axis or, in other words, spin in its tracks. This type of mobility is achieved by a combination of factors, some of which involve the frame or body design. For example, it is preferable to have the wheel base shorter than the center-to-center distance between the wheels on opposite sides of the loader. This will tend to reduce tire wear and resistance to skid turns.

Proper weight distribution is also a factor. Thus the engine is located in the rear and partially counterweights the loader bucket in front. The weight is predominately on the rear wheels with the bucket empty, but shifts to the front wheels when the bucket is filled.

Heretofore when attention has been given to the frame or body design conducive to the manufacture and performance of such vehicles, it has usually involved minor changes to a design already in use and well accepted.

DESCRIPTION OF THE PRIOR ART

One common type of body construction employs a pair of side tanks joined by transverse bridging members providing an engine space at the rear between the tanks and a space for the operator's leg at the front with the drive components largely being housed within the side tanks. The wheels are mounted on stub axles journaled in the lower walls of the side tanks. Two independent, variable speed transmissions, one in each side tank, drive the wheels.

A skid steered loader employing an hydrostatic drive having a body construction of this type is disclosed in U.S. Pat. No. 3,635,365 eititled "Tractor Vehicle With Hydrostatic Drive Means" by James J. Bauer which issued Jan. 18, 1972 to the assignee of the present invention. The design is also the subject of U.S. Design Pat. No. 224,588 eititled "Self-Propelled Loader Vehicle" by the same inventor, issued Aug. 8, 1972, also assigned to the assignee of the present invention.

A self-propelled loader having spaced side tanks and being driven by separate, variable speed, friction clutch transmissions is disclosed in the earlier U.S. Pat. No. 3,231,117 entitled "Tractor Vehicle and Drive Therefor" issued to C. E. Melroe et al on Jan. 25, 1966 and partially assigned to the assignee of the present invention.

A small, self-propelled, skid steered loader also having a dual clutch drive which differs from the body structure disclosed in the aforementioned patent in that the clutch drives are housed within a center compartment with stub axles projecting outwardly on opposite sides is disclosed in pending U.S. Design application Ser. No. 240,344, filed Mar. 31, 1972 by James J. Bauer and assigned to the assignee of the present invention.

In each of these machines, the loader uprights or stanchions that support the loader arms are secured to the rear of the loader body and transmit the loader forces directly to the body.

None of these constructions were envisioned as special skid steered loader frame designs capable of isolating loader and skid steering forces from the drive components. This is especially important for hydrostatically driven loaders.

SUMMARY OF THE INVENTION

The combination of a tractor vehicle and subframe, especially for a hydrostatic drive, skid steered loader, in which the tractor drive components are housed within a central compartment surrounded substantially by the subframe.

Especially in the case of a skid steered loader, the loader subframe comprises a pair of longitudinally extending, laterally spaced side beams mounted over the front and rear stub axles. An interior, generally rectangular, area receives the tractor body. The subframe substantially surrounds the center compartment in laterally spaced relation. The arrangement is such that skid steering forces as well as the normal loader forces are largely isolated from the center compartment and the drive components contained therein.

A pair of uprights is fabricated from plate material integral with the side beams to structurally support the loader arms at upper pivotal mountings on each side at the rear.

In the preferred embodiment, the loader subframe forms a relatively rigid, encircling, protective enclosure for the tractor body and engine. Except for the wheels, the drive components are all housed within the center compartment of the body. Any possible damage, such as by bumping into a post of a pivot turn is taken by the loader subframe without damage of the engine or tractor body.

In the preferred embodiment, dual variable displacement pumps drive hydraulic motors which drive into gear reduction boxes bolted onto each side of the center compartment. The hydraulic fluid supplying the pumps and motors is collected in the lower regions of the compartment without requiring a separate tank. The hydraulic fluid also serves as the liquid lubricant to continuously oil the gear reduction and chain drives. Thus in an hydraulically propelled machine, the reservoir for the hydraulic fluid is the compartment housing the drive components.

Damage to the hydraulic components from running over stumps or stones is avoided since the components are completely enclosed. The construction thus eliminates the need for a separate belly pan as is required by the prior art side tank design.

In addition separate manufacturing runs or assembly lines may be set up whereby the tractor body is preassembled, including installation of the engine, connection of the hydraulic lines, and drive components on one line while on another line, set up for metal fabrication, the loader subframe is manufactured as a separate unit. The two will then be assembled in a final assembly operation merely by dropping the subframe on the tractor and bolting it down.

In the prior art there was often a point of high stress or weakness in the stanchions where they attach to the body. This was especially apparent in loaders having high lift capacities and break-out forces. With the present invention, however, loader forces are largely isolated in the encircling subframe without reaching the body or drive components.

Also, skid steering forces place unusual strains on the loader frame and axles not encountered in machines steered conventionally by turning the wheels. The present invention provides a closed or box loader subframe fastened over the axles which adds stability without increasing the weight of the machine.

These and other advantages will be more apparent by referring to the following detailed description which proceeds with a description of the drawings wherein:

DESCRIPTION OF THE PREFERRED EMBODIMENT

Figure 1:
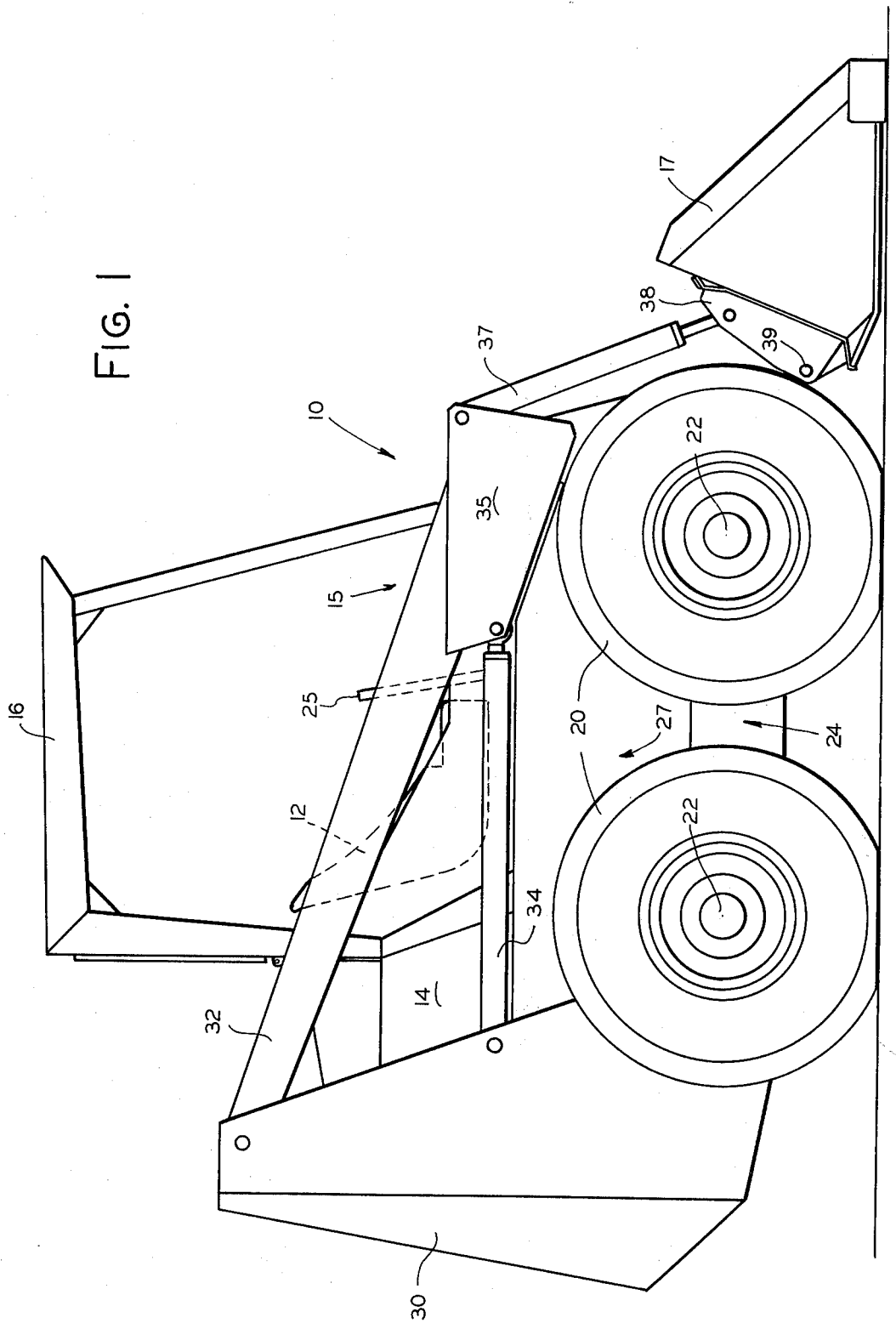
FIG. 1 is a side elevational view of a rigid frame, skid steered, end loader having a loader subframe in accordance with a preferred embodiment of the invention.
Figure 2:
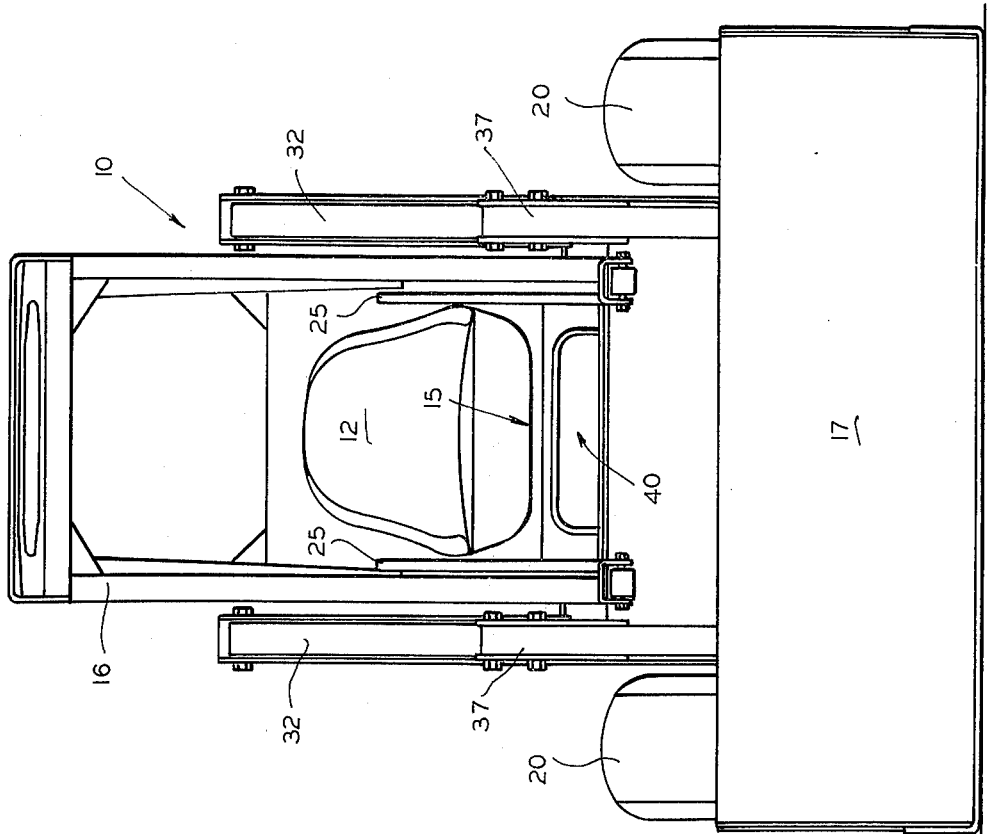
FIGS. 2 and 2a are respectively rear and front views of the end loader shown in FIG. 1.
Figure 2A:
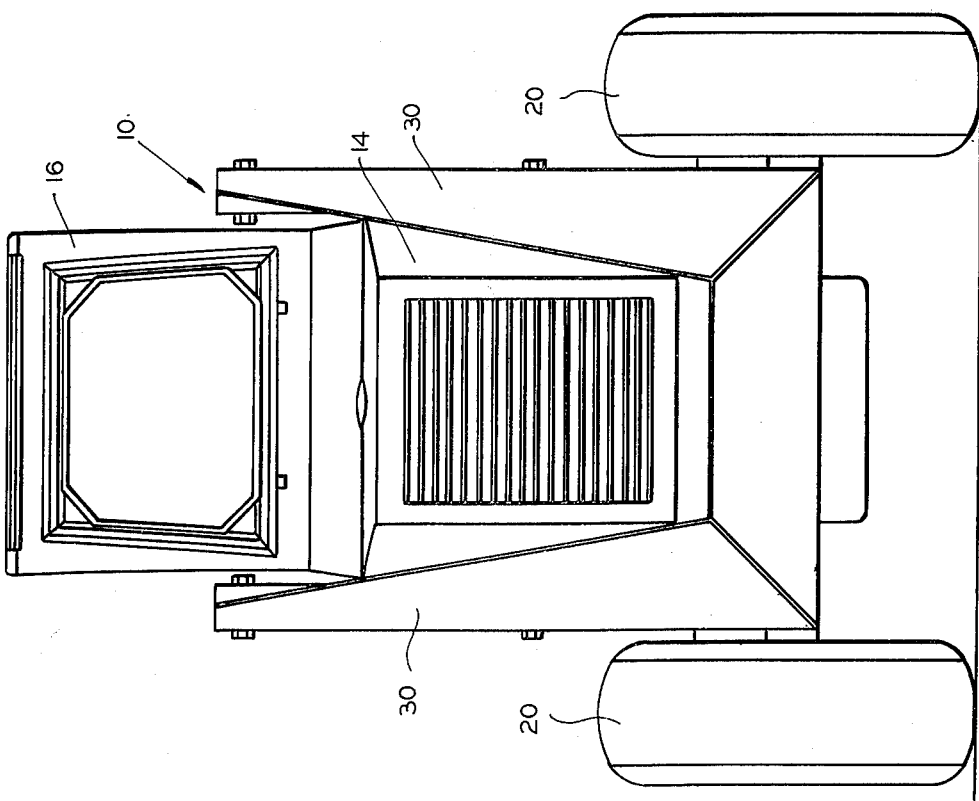

FIGS. 1, 2 and 2a are shown side rear and front elevational views of a rigid frame, skid steered end loader 10 having the general arrangement of an operator's seat 12 in the middle of the loader with an engine space 14 at the rear and a space 15 at the front for the operator's legs. The operator's compartment area is enclosed by an overhead framework 16 providing protection against objects falling onto the operator from above such as material spilling over the rear of the bucket 17 when in a raised position. The framework 16 also serves as a roll over protective structure. Wheels 20 are mounted on stub axles 22 projecting outwardly from opposite sides of the loader body 24. It will be understood by those acquainted with skid steered loaders that the machine 10 is propelled through a turning motion by driving the wheels 20 on one side at a different speed and/or direction than those on the other side causing the loader to have great mobility or maneuverability in either the forward or the reverse direction. The "steering" is controlled by the operator using a pair of levers 25, one on each side of the operator's seat 12, which may be moved independently in a fore and aft direction to cause the wheels 20 on that side of the machine to rotate at a speed and in a direction corresponding to the position of the lever 25. For example, both levers 25 may be moved together in either a forward or rearward manner causing the loader to travel straight forward or back up at variable speeds depending upon the position of the lever. Or, the operator may move the levers simultaneously but to a greater extent on one side than the other thus causing the loader to execute a turn. Or, by pushing one lever in one direction and pulling the other in the opposite direction the loader is turned on its axis or spun around virtually in its own tracks. At the rear there is a pair of uprights 30 pivotally mounting at the upper end lift arms 32 which extends forwardly alongside the operator's compartment and then sharply downwardly at the front of the machine mounting at the forward ends thereof the bucket 17. A lift cylinder 34, one on each side, is pivotally mounted at the rear end to the upright 30 and at the rod end to a gusset plate 35 on the lift arm. A bucket tilt cylinder 37 is pivotally mounted on the upper end to the gusset plate 35 and at the rod end to the bucket mounting attachment 38 which pivotally mounts the bucket 17 onto the arms at 39. By means of foot pedals generally indicated at 40 (FIG. 2a) the operator is able to control independently the extension and retraction of the lift and bucket tilt cylinders 34, 37 when working with the machine. It will be understood that while an end loader is depicted in the drawings the machine may be outfitted with various attachments other than the bucket 17. In addition, as will be apparent in the following description, the vehicle itself may take one of several different forms other than an end loader depending upon the functional characteristics of the subframe assembly, described herein as a loader subframe assembly, however, it being envisioned as a feature of the invention that other applications would require its own special subframe. In other words, the concept is one of a self propelled skid steered tractor vehicle accommodating a family of subframes one of which is a loader subframe 27 as described herein.

Figure 3:
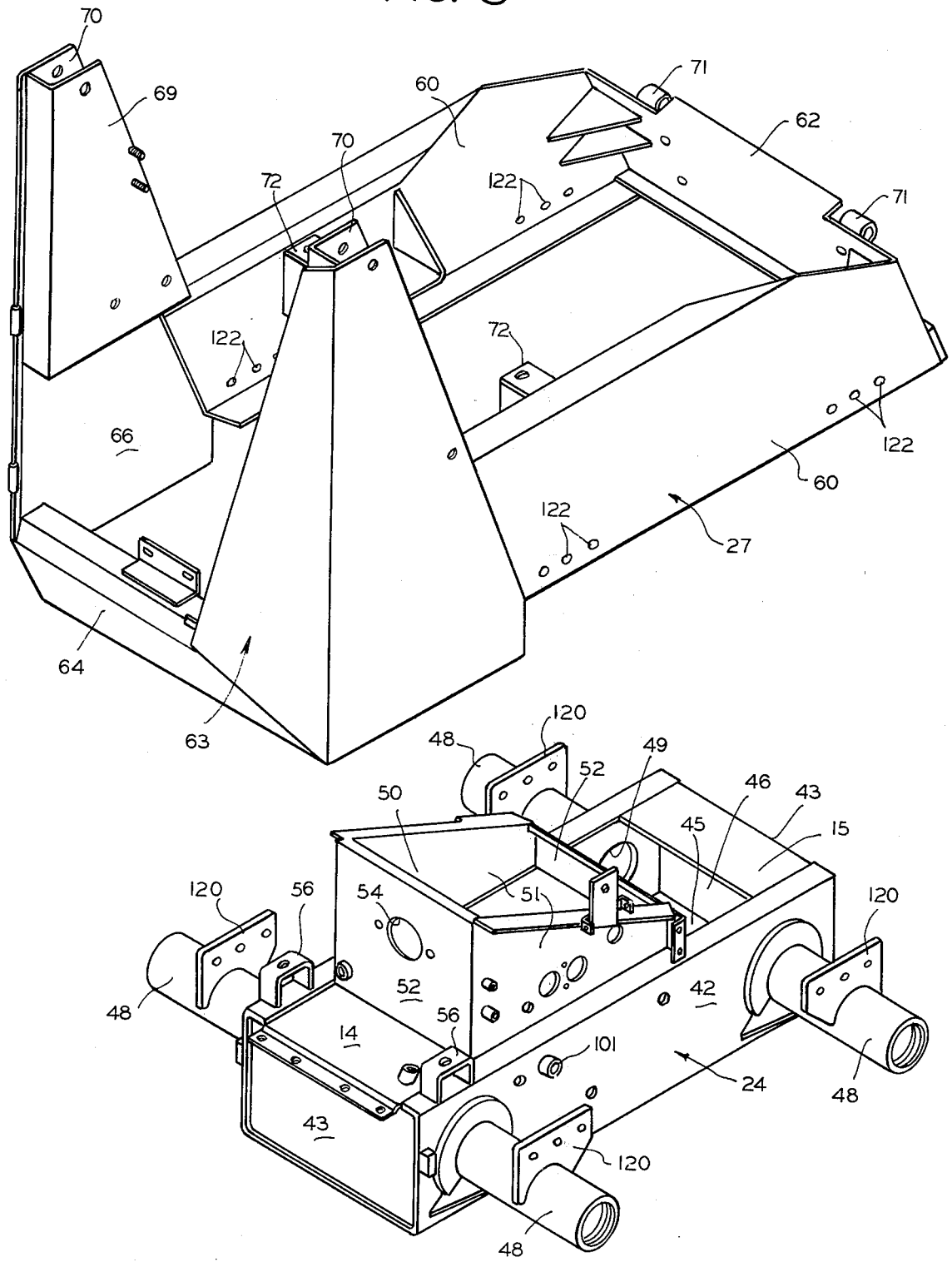
FIG. 3 is a perspective, disassembled view taken from the right rear quarter position showing the loader subframe being dropped onto the body below.

Referring now to FIG. 3 which is an exploded or disassembled view of the tractor body 24 below the loader subframe 27, it will be seen that the tractor body 24 comprises side walls 42, end walls 43 and bottom walls 45 together defining a lower compartment area 46. Stub axle housings 48 project from opposite sides of the compartment 46 adjacent each end. The axle housings 48 are solidly mounted in the side walls 42 and open at their inner ends 49 into the compartment 46.

The rapid mobility of skid steer machines depends on several design parameters one of which is the tread width to wheel base ratio. That is, it has been found that those skid steer loaders which are most maneuverable in practice have a width between wheels on opposite sides taken from the center of the tread which is greater than the length between axles by a factor which also takes into account the fore and aft stability of the machine. Preferably the tread width to wheel base ratio should be in the order of 4 to 3. Thus, the length of the compartment 46 which will just accommodate the axle housings 48 at the required wheel base dimension is a direct function of the aforementioned skid steer parameter.

Figure 5:
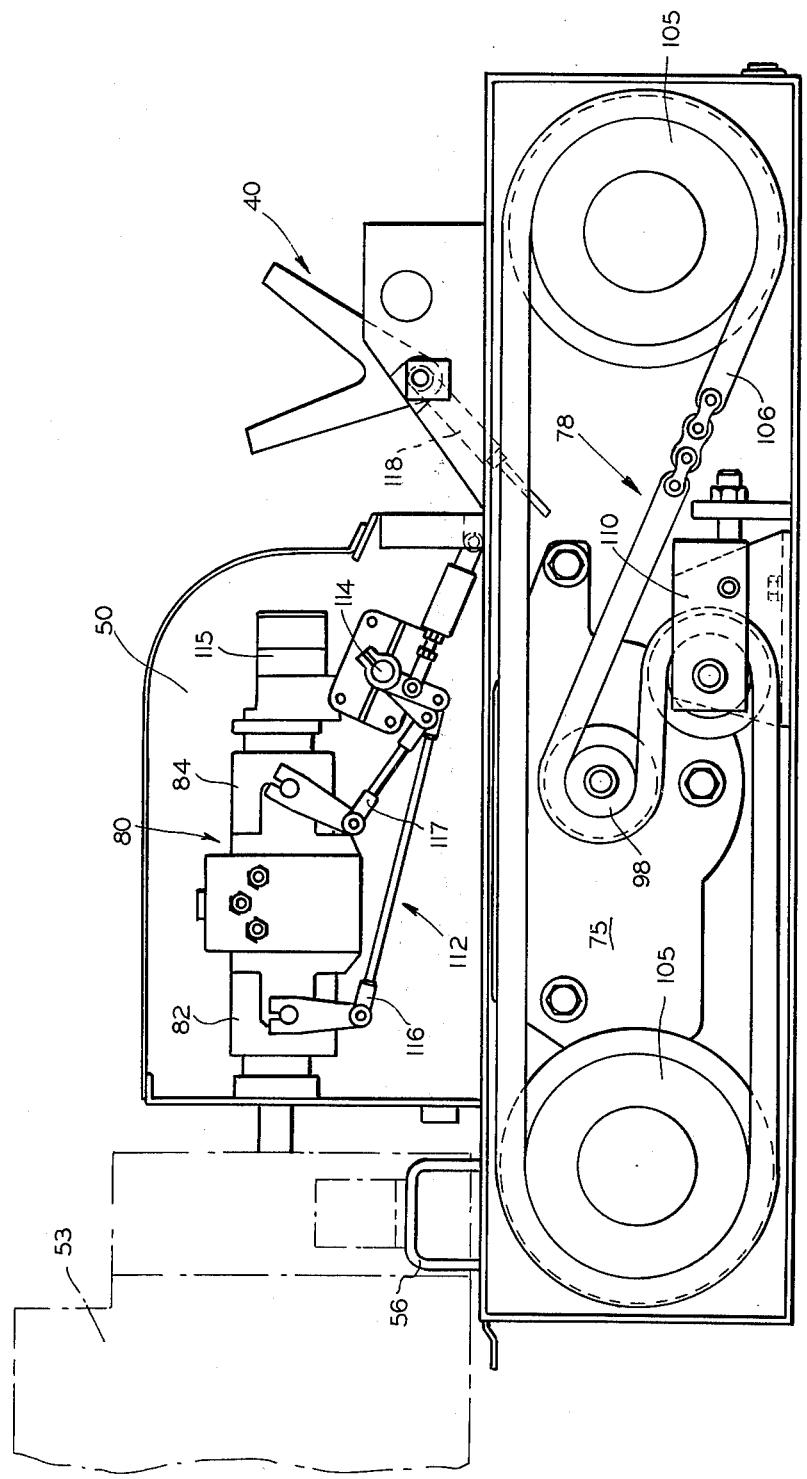
FIG. 5 is a vertical sectional view of the drive components in the body compartment.

An upper compartment area 50 is defined by side walls 51 and end walls 52 which are spaced inwardly of the side and end walls 42, 43 defining at the rear space 14 for the engine and at the front space 15 for the operator's legs. As depicted in FIG. 5 the engine 53 will be mounted in the space 14 with the drive shaft projecting through an opening 54 and the engine being mounted at the rear on mounts 56.

The loader subframe 27 includes a pair of laterally spaced, longitudinally extending side beams 60 joined at the front by a cross member 62 and at the rear by an upright fabrication 63 including a cross member 64. The upright fabrication includes a pair of uprights 66 formed of plate material, wider at the bottom and tapering upwardly toward the top which together with an inwardly spaced shoulder plate 69 having the same general configuration as the upright plate 66 provides a pivotal mounting location 70 for the lift arms 32. The front cross member 62 includes a pair of pivotal mountings 71 which cooperate with brackets 72 on the side beams 60 in mounting the protective framework 16 which may be unfastened at brackets 72 and hinged forwardly on the pivotal mountings 71 for access into the compartment areas of the tractor body.

In manufacture, the loader or tractor body 24 might well be assembled with the tractor drive components on one assembly line while the loader subframe 27 is being fabricated at another location or on a separate line.

Figure 4:
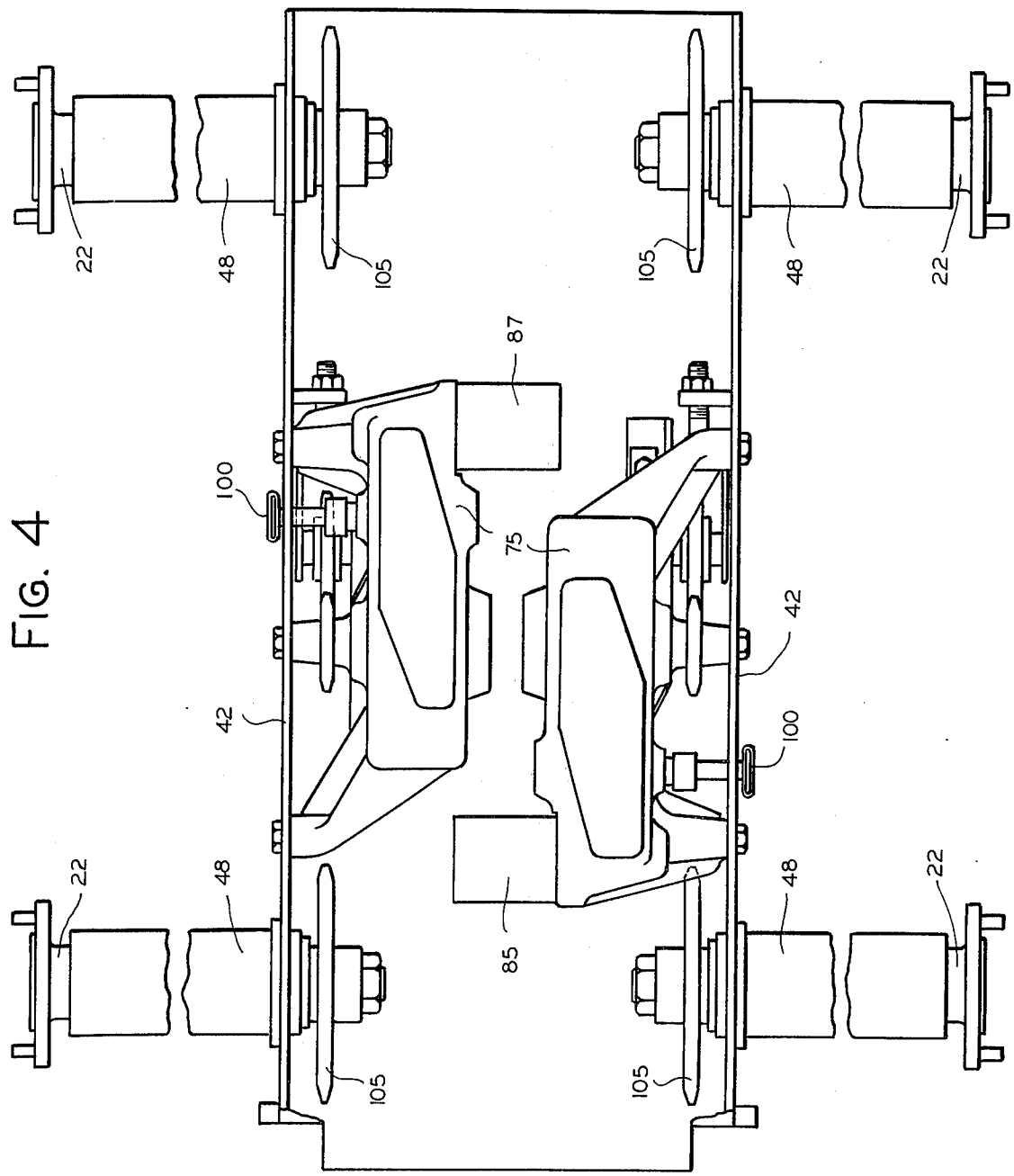
FIG. 4 is a horizontal partial sectional view of the tractor body showing portions of the hydrostatic drive.

Turning now to FIGS. 4 and 5, the tractor body 24 will accommodate in the lower compartment area hydraulic motor and gear reduction units 75 and the chain and sprocket drives 78 (FIG. 5) while the smaller upper compartment area 50 houses first and second variable displacement pump units 80 driven on a common shaft connected to the engine drive shaft through the opening 54 in the rear wall of the upper compartment.

In more detail, first and second pumps 82, 84 are operatively connected by means of hydraulic hoses (not shown) to first and second hydraulic motors 85, 87 on the gear reduction cases 75 in the lower compartment. Each hydraulic motor 85, 87 has an output shaft which drives into an input shaft 88 (FIG. 6) of the associated right or left hand gear reduction case 75. The latter units are identical in construction and as best seen in FIG. 4 are installed in reversed relationship on opposite sides of the lower compartment area. The input shaft 88 of each gear reduction case 75 has a gear 89 which drives gears 90 and 93 on a jack shaft 92. The gear 93 engages with a gear 95 splined on an output shaft 96 which has a drive sprocket 98 at its outer end. The jack shaft 92 is held by a spring biased ball detent 99 in the drive position but is slidable axially toward the left as viewed in FIG. 6 when pulled by the handle 100 extending through an opening 101 in the side walls 42. When pulled by the handle 100, the jack shaft 92 will slide to the left carrying with it the gears 90, 93 (shown in dot dash position) such that the gear 93 will become fully disengaged from gear 95 allowing the output shaft 96 and sprocket 98 to free wheel. This disconnect feature allows the loader to be towed at highway speeds.

Figure 6:
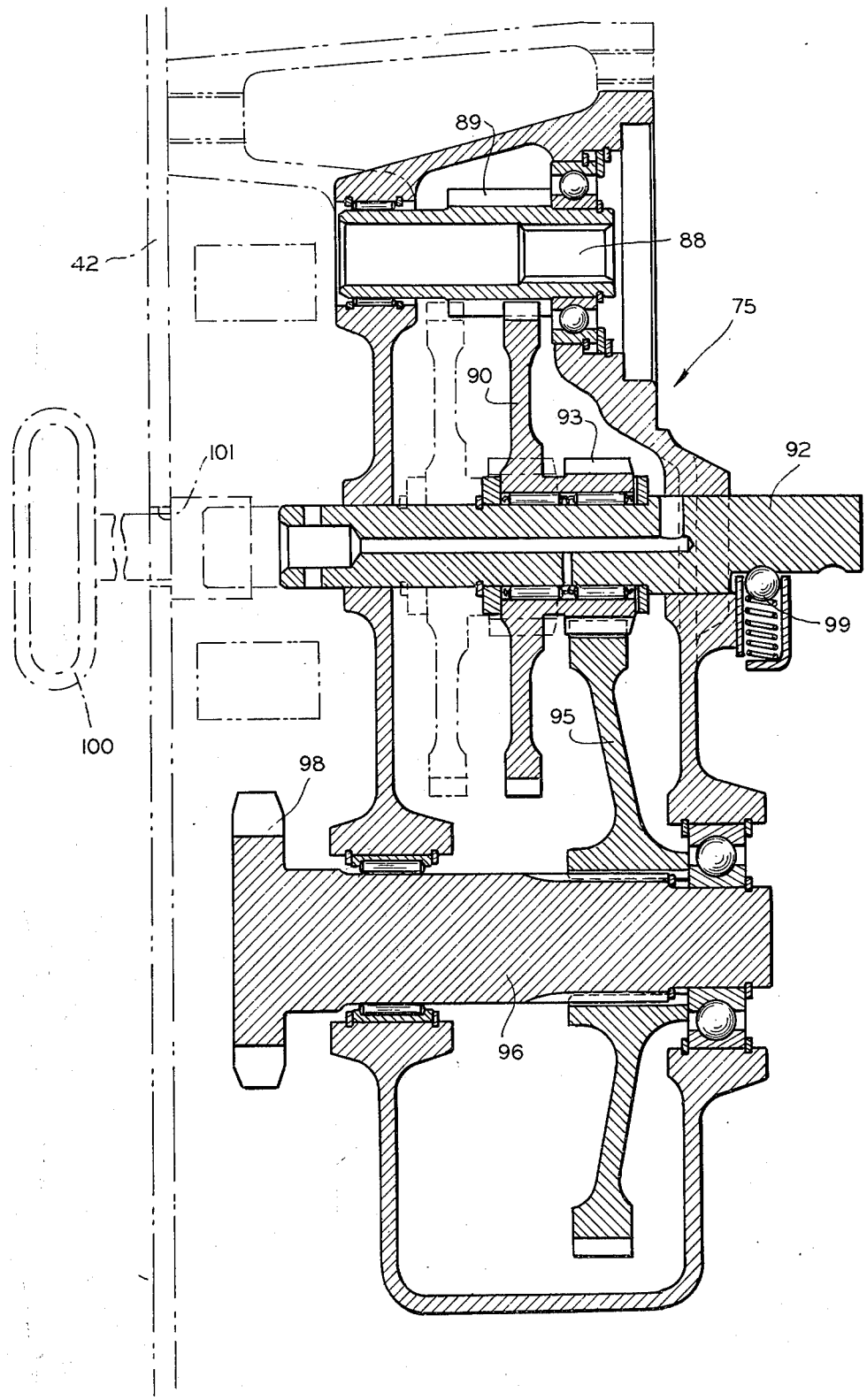
FIG. 6 is a horizontal sectional view through one of the gear reduction cases.

When in the position shown in FIG. 6, however, the hydraulic motors 85, 87 are drivably connected through the gear train in the gear reduction cases 75 to the chain drives 78 on each side of the lower compartment. Stub axles 22 are rotatably journaled in the axle housings 48 and carry on their inner ends chain sprockets 105 which are connected by an chain 106 to the drive sprocket 98 of first and second gear reduction cases 75. A chain tensioning mechanism 110 is provided for adjusting the slack in the chain 106.

It will be appreciated that each of the first and second variable displacement pumps 82, 84 includes a circular array of pistons and cylinders which revolve against swash plates (not shown) which may be tilted by means of a control linkage 112 to vary the displacement of the pumps 82, 84. The control linkage 112 is connected by means of a shaft 114 to the control levers 25 on each side of the operator's seat 12 such that movement of either the right or left lever 25 will cause movement of linkage 116 or 117 so as to change the angle of the swash plate of either the pump 82 or 84 depending on what is desired. It is understood, of course, that the engine 53 will be driven at a constant rpm ordinarily and variable speed is attained by manipulation of the swash plates.

A hydraulic system pump 115 also driven on the common shaft with the pumps 82, 84 will be operatively connected by means of hydraulic hoses to the lift and tilt cylinders 34, 37 which are controlled by an hydraulic valve (not shown) connected by a linkage 118 to the foot pedals 40.

It is important to note that the lower compartment area will be partially filled with hydraulic fluid (not shown) and serves as a reservoir for the hydraulic components of the machine. In addition, the hydraulic fluid lubricates the chain drives 78.

It will now be seen that the tractor body 24 when assembled with the hydrostatic drive components and wheels mounted on the stub axles 22 with the engine 53 installed is a skid steered, self propelled tractor or basic drive unit. The loader subframe 27 which is dropped onto the axle housings 48 and bolted to bosses 120 which align with holes 122 in the side beams of the subframe convert the tractor unit 24 into a special application vehicle, namely an end loader. It will be noted that the side beams together with the front and rear cross members 62, 64 define an interior generally rectangular spaced which receives the body portion of the tractor protectively surrounding it while the upright plates 66 form a partial enclosure for the engine as well as supporting the lift arms of the loader.

While only a single embodiment of my invention has been described in detail, it will be understood that each detailed description is intended to be illustrative only and that various modifications and changes may be made to my invention without departing from the spirit and scope of it. Therefore, the limits of my invention should be determined from the attached claims.

I claim:

1. A tractor vehicle and material handling subframe, in combination, comprising a tractor body defined in part by side walls on opposite sides of the tractor centerline, by end walls at opposite ends of the side walls and by a bottom wall all partially enclosing a compartment area, an engine, hydraulic drive means powered by said engine contained within said compartment, a plurality of spaced stub axles projecting from the side walls on opposite sides of said compartment, wheels driven by said hydraulic drive means rotatably mounted on said stub axles, a subframe mounted on said tractor body comprising laterally spaced, longitudinally extending side beams, support means mounted on said stub axles, said side beams secured to said stub axles on said support means and defining an interior space for receiving said tractor body, upright members projecting upwardly from adjacent the rear of each side beams on each side of said engine and providing at the upper ends thereof a pair of pivotal mountings, a pair of lift arms pivotally attached at said pivotal mountings and extending forwardly along each side and downwardly at the front in the lowered position mounting a material handling means whereby material handling loads are contained predominately in said subframe and transferred to said stub axles directly.

2. A tractor vehicle and material handling subframe as defined in claim 1 wherein said side, end and bottom walls define an upper compartment area joining a lower compartment area, said engine being mounted on the rear of said body and driving into said upper compartment area, said hydraulic drive means including first and second variable displacement pumps each of which has a series of revolving pistons and cylinders rotatably driven on a common shaft connected to said engine in said upper compartment area and first and second hydraulic motors operatively connected with said first and second pumps situated in said lower compartment area and drivably connected to said wheels.

3. A tractor vehicle and material handling subframe as defined in claim 2 wherein first and second gear reduction cases are mounted on opposite sides of said side walls, each having an input shaft driven by said first and second motors respectively and an output shaft drivably connected to said wheels.

4. A tractor vehicle and material handling subframe as defined in claim 3 wherein said stub axles sealably project through said side walls into said lower compartment area and have a drive sprocket on the inner ends thereof, first and second chain drive means drivably connected to said sprockets and being driven by said output shafts of said first and second gear reduction cases.

5. A skid steered loader vehicle comprising a body defined in part by side walls on opposite sides of the vehicle center line, by end walls at opposite ends of the side walls and by a bottom wall partially enclosing a compartment area, a pair of stub axles spaced, one axle behind the other, at opposite ends of the compartment and projecting outwardly from each side, tubular axle housings rigidly secured to said side walls and surrounding said stub axles, a mounting boss on each of said tubular axle housings, an operator's compartment intermediate the end walls above said compartment area a loader subframe comprising laterally spaced, longitudinally extending side beams and cross members at each end defining a generally interior rectangular space for receiving and partially surrounding said body, said side beams having longitudinally spaced mounting locations for mounting on said mounting bosses for securing said subframe onto the body, upright members projecting upwardly from adjacent the rear of each side beam providing at the upper ends thereof a pair of pivotal mountings, a pair of lift arms pivotally attached at said pivotal mountings and extending forwardly along each side and downwardly at the front in the lowered position mounting a material handling means whereby material handling loads are contained predominately in said subframe and transferred to said tubular axle housings directly.

6. A skid steered loader as defined in claim 5 wherein a pair of laterally spaced, pivotal mounting locations are provided on the subframe and a protective structure for the operator's compartment is mounted at said pivotal mounting locations capable of pivoting out of the way for access to said compartment area of the body.

7. A skid steered loader comprising in combination separate tractor and loader subframe assemblies, said tractor assembly including a body defined in part by side walls on opposite sides of the loader center line and by end walls at opposite ends of the side walls and a bottom wall enclosing at least partially a lower compartment area having a length less than the distance between wheels on opposite sides of the loader, additional side and end walls spaced from said first mentioned side and end walls defining a smaller upper compartment area medially of said tractor body so as to provide an engine space at the rear thereof and a space for the operator's legs at the front, a pluarlity of stub axles projecting from the sides of the lower compartment area and spaced apart less than the width across between the wheels, a support mounting on each stub axle said loader subframe assembly comprising a pair of laterally spaced, longitudinally extending side beams generally defining therebetween a space longer than it is wide to receive and partially surround said tractor body and secured to said support mountings on the stub axles, a pair of upright members joined at the bottom by a cross member, said upright members being formed of metal plate elements wider at the bottom than at the top so as to protectively enclose a portion of said engine space, a shoulder plate secured inwardly of and spaced from said upright plate and generally conforming to the configuration of the upper portion thereof providing a pivotal mounting location at the upper end thereof between said shoulder and upright plates, a pair of lifting arms, one connected between each upright and shoulder plate at the pivotal mounting location and extending forwardly and downwardly therefrom alongside the operator's space and supported in the lowermost position on the front portion of the subframe and said arms extending downwardly immediately at the front of said loader and mounting a material handling member on the ends thereof whereby said upright members and side beams protectively surround the tractor and loader forces are contained and transferred to the stub axles directly.

8. A tractor vehicle comprising a body defined in part by spaced side walls, end walls and a bottom wall partially enclosing a compartment area, four ground-engaging wheels, two on each side, front and rear axles rotatably supporting said wheels on one end spaced from said side walls, four openings, two on each side, through said side walls into said compartment area through which the opposite ends of said axles extend, right and left gear reduction means in said compartment area each having wheel sprockets, one on the said opposite end of each axle within said compartment area, an output drive sprocket intermediate the front and rear wheel sprockets for driving the wheels and endless chain means driven by said output drive sprockets and traveling around said wheel sprockets for driving the wheels independently in either forward or reverse directions, a power source, hydrostatic transmission means transmitting power from said power source independently at variable speeds to said right and left gear reduction means, said vehicle being propelled and steered by driving the wheels on one side independently of the wheels on the opposite side, and said wheels being spaced apart on axes perpendicular to a vertical center plane through the compartment area a distance greater than the distance between said axes in said plane, and a material handling subframe comprising a separate fabricated assembly including a pair of laterally spaced, longitudinally extending beams mounted on the axles in the space between the tractor body side walls and the wheels, a pair of uprights, one on each side, adjacent the rear thereof providing at the upper ends a pivotal mounting location, a pair of lift arms, one on each side, pivotally mounted at the rear on said mounting locations of the uprights and extending forwardly and downwardly in the lowered position for mounting a material handling member at the front, hydraulic cylinder means carried on said material handling subframe for raising and lowering said lift arms and pivoting a material handling member when mounted on the forward ends of the lift arms whereby material handling loads are contained in said subframe and transferred to said stub axles directly.

9. A tractor vehicle according to claim 8 wherein the tractor body comprises upwardly extending wall portions defining an upper compartment area, an opening in the rear wall of said upper compartment area, said power source being mounted behind said rear wall of the upper compartment area, a shaft driven by said power source extending through said opening, said hydrostatic transmission means including a pair of variable displacement hydrostatic pumps mounted in said upper compartment area aligned with each other and said shaft, each said pump comprising revolving piston and cylinder groups driven in unison and in the same direction of rotation by said shaft.

10. A tractor vehicle according to claim 8, wherein said tractor body includes front and rear axle housings secured to said side walls within which the front and rear axles are journalled and mounting means for removably securing said material handling subframe to said axle housings.

11. A tractor vehicle according to claim 8, wherein said uprights of the material handling subframe each comprises an outer plate wider at the bottom and tapering upwardly toward the top providing one side of said pivotal mounting location and an inner plate secured to the outer plate and spaced therefrom providing the other side of said mounting location and each of said lift arms being pivotally mounted between said plates.

12. A tractor vehicle according to claim 9, wherein said right and left gear reduction means each includes a gear case mounted on the opposite side walls within said compartment area and having identical configurations in reverse relationship on opposite sides of said vertical center plane viewed in a horizontal plane thereabove, input shafts into gear cases perpendicular to said center plane on spaced axes and, said hydrostatic transmission means including a pair of hydrostatic motors, one mounted on each gear case connected with said input shaft and driven by one of said variable displacement hydrostatic pumps.

13. A tractor vehicle according to claim 12, wherein each gear case includes said output drive sprocket and a plurality of gears are in meshing relationship connecting said input shaft and sprocket including a first gear driven by said input shaft, an intermediate shaft spaced from said input shaft axially shiftable between first and second positions perpendicular to the vertical center plane, an intermediate gear rotatably mounted on said intermediate shaft and being shiftable therewith between said first and second positions, an output shaft connected to the output drive sprocket, a gear driving the output shaft and meshing with said intermediate gear in the first position and being disengaged therefrom in the second position in which latter case said hydrostatic transmission means is disconnected from driving relationship with said wheels.

* * * * *